United States Patent Office 3,375,676
Patented Apr. 2, 1968

3,375,676
METHOD OF STORING HYDROGEN
James J. Reilly, Jr., Bellport, and Richard H. Wiswall, Jr., Brookhaven, N.Y., assignors to the United States of America as represented by the United States Atomic Energy Commission
No Drawing. Filed May 23, 1967, Ser. No. 642,289
4 Claims. (Cl. 62—48)

ABSTRACT OF THE DISCLOSURE

A method for storing hydrogen whereby gaseous hydrogen is absorbed by copper-magnesium alloys at temperatures above 250° C. and pressures above 30 pounds per square inch.

---

The invention described herein was made in the course of, or under a contract with the U.S. Atomic Energy Commission.

Prior art

Hydrogen is conventionally stored in pressure vessels which are dangerous both from fire and explosion hazards. Others in the art have tried to form stable metal hydrides in order to eliminate the hazards arising from containment of hydrogen in pressurized containers. The metals and alloys previously employed by those skilled in the art have been too expensive to allow their widespread use in conventional processes such as rockets and fuel cells.

In U.S. Patent No. 3,315,479, R. H. Wiswall Jr. and J. J. Reilly issued Apr. 25, 1968, disclosed a method of storing hydrogen whereby gaseous hydrogen is absorbed by nickel-magnesium alloys at temperatures above 250° C. and pressures above 18 pounds per square inch. The hydrogen loaded alloys disclosed in U.S. Patent No. 3,315,479 when heated to temperatures of 250° C. give off hydrogen at a pressure of slightly over one atmosphere.

It is an object of this invention to provide those skilled in the art with a simple, economical, safe method of storing hydrogen.

Summary of the invention

A novel method for storing hydrogen by forming a hydrogen metal alloy complex, wherein hydrogen gas is absorbed into a metal alloy, comprising contacting gaseous hydrogen with a solid copper-magnesium alloy, said alloy containing from about 9 weight percent to about 83 weight percent copper based upon the total weight of the copper magnesium alloy and from about 17 weight to about 91 weight percent magnesium based upon the total weight of the copper-magnesium alloy, while maintaining said hydrogen and said alloy at a pressure of at least about 30 pounds per square inch and at a temperature of at least about 250° C. until said alloy has absorbed up to about 6.85 weight percent hydrogen based upon the total weight of the copper-magnesium alloy.

Description of the invention

The amount of hydrogen that can be absorbed by our novel complexes is directly proportional to the amount of magnesium contained in the alloy. The rate of adsorption of the hydrogen onto our novel complex is directly proportional to the pressures employed during the loading operation. When higher temperatures are employed during the loading operation, of course higher pressures will be required.

The product formed by our method is a hydrogen-copper magnesium complex, whose exact physical and chemical structure is not known at this time.

The hydrogen copper-magnesium complexes produced by the practice of our invention are stable at temperatures below 200° C. and the complexes need not be stored in pressure vessels. Thus, hydrogen can be readily stored by forming the complex in accordance with the method disclosed by our invention and thereafter cooling the complexes and maintaining them at normal atmospheric pressures until it is desired to release the hydrogen contained therein. To release the hydrogen from the complex, all that is required to be done is to heat the hydrogen containing complex to a temperature above 200° C. and to allow the hyrogen to escape.

A unique feature of our novel complexes is the fact that hydrogen is released at a constant rate from a complex when the complex is maintained at a specific temperature at or above 200° C. until the complex contains less than 0.05 weight percent of hydrogen based on the total weight of copper-magnesium alloy contained in the complex. For example, a hydrogen copper-magnesium complex containing 6.85 weight percent hydrogen based upon the weight of the copper-magnesium alloy upon being heated at a constant temperature of 250° C. will maintain a constant hydrogen pressure of 5 lbs. per square inch above the alloy until about 0.05 weight percent of hydrogen remains in the complex. This feature provides those skilled in the art with a simple hydrogen source in which the rate of release can be carefully controlled by simply controlling the temperature of the complex during the release. Thus, it will be apparent to those skilled in the art that our invention can be readily adapted to conventional techniques to provide a safe dependable source of hydrogen for a multitude of uses such as rockets, fuel cells, etc.

In the preferred embodiment of our invention, the copper-magnesium alloy contains 56 weight percent copper and 44 weight percent magnesium based on the total weight of the alloy. The alloys found useable in our invention can be produced by any conventional alloying technique. They can be produced by simply heating the proper amounts of copper and magnesium under an inert or hydrogen atmosphere with an induction heater until a melt is formed, intimately mixing the ingredients of the melt and thereafter cooling the melt until a solid alloy is formed. Liquid metal alloys are not desirable for use in the practice of our invention because the pressure requirements required to form the desired hydrogen-alloy complex would be too great. The presence of oxygen in the copper-magnesium alloy is to be avoided as oxygen tends to inhibit the rate of formation of the complex. We have found it preferable to use a powdered copper-magnesium alloy in the practice of our invention because the increased surface area provided by the powder increases the rate of absorption of the hydrogen by the alloy. However, our invention is not limited to any particular physical shape of the alloy, blocks and meshes of the alloy can be employed and indeed in certain applications such shapes may be desirable. Conventional pressure vessels and heating devices may be employed in the practice of our invention.

In the preferred embodiment of our invention the hydrogen and the copper-magnesium alloy are heated to a temperature of 300° C. and maintained under a pressure of 200 pounds per square inch absolute during the loading operation. The pressure can be maintained by adding additional increments of hydrogen to the system to counter balance the increments taken up by the alloy during the absorption phase of the process.

We have found that about 1.9 atoms of hydrogen will be adsorbed per atom of metal contained in an alloy containing minimal amounts of copper. One mol of an alloy having the formula $Mg_2Cu$ will absorb up to 1.5 mols of hydrogen during the practice of our invention.

Example I

*Apparatus.*—An upright reactor-vessel consisting of a stainless steel tube flanged on the top end and having an inside diameter of one inch and a length of about 4.0 inches was fitted with a thermocouple well in the bottom end of the vessel. The bottom end of the vessel was sealed and a connection was fitted to the top of the vessel to permit gas to be withdrawn and introduced in the vessel. The vessel was inserted into an electrically heated furnace. Samples were placed in the vessel.

Procedure

A 2 gm. sample of an alloy consisting of 44% by weight Mg and 56% by weight of $Cu(Mg_2Cu)$ was weighed out in a dry box. The sample was pulverized so that it could pass through a 25 mesh screen (U.S. Standard sieve series), reweighed and introduced into the vessel. The sample was immersed in acetone so that it was not exposed to air as the vessel was removed from the dry box and introduced into the heater. The vessel was sealed, evacuated and the sample heated in vacuo for about 2 hours at a temperature of 350° C. and allowed to cool to room temperature. $H_2$ was admitted to the vessel until a pressure of 350 p.s.i.a. was reached. The reactor vessel was then heated to about 300° C. The rate at which the sample absorbed $H_2$ could be determined by the pressure decrease in the system over a period of time. When adsorption was essentially complete, the reactor was cooled to room temperature and gaseous $H_2$ was vented from the system until a predetermined pressure of 30 p.s.i.a. was reached. The sample was reheated to about 300° C. and allowed to come to equilibrium and the pressure recorded. At equilibrium some gaseous $H_2$ was removed from the system after which a new equilibrium was reached. When no further $H_2$ evolved from the sample upon removing gaseous $H_2$, the entire cycle was repeated by readmitting $H_2$ into the system and reabsorbing $H_2$ in the alloy.

Results

A hydrogen content of about 2.7 wt. percent has been repeatedly obtained by absorption in an alloy with the starting composition of 44 wt. percent Mg, 56 wt. percent $Cu(Mg_2Cu)$. The fact that the sorption-desorption cycle can be repeated indefinitely is of practical significance for it allows for economic use of the alloys to effectuate $H_2$ storage.

We have also prepared samples of the alloy which were cooled to room temperature after they had absorbed about 6.6 weight percent hydrogen based upon the weight of the nickel-magnesium alloy. These samples did not lose their hydrogen upon exposure to the atmospheric conditions found in our laboratory. Further, they were not damaged when they were recycled through the procedure described in this example.

We claim:

1. The method of storing hydrogen comprising contacting gaseous hydrogen with a solid copper-magnesium alloy, said alloy being composed of from about 9 weight percent to about 83 weight percent copper based on the total weight of the copper-magnesium alloy and from about 17 weight percent to about 91 weight percent magnesium based upon the total weight of the copper-magnesium allow, while maintaining said hydrogen and said alloy at a pressure of at least about 30 pounds per square inch and at a temperature of at least about 250° C. until said alloy has absorbed up to about 6.85 weight percent hydrogen based on the total weight of the nickel-magnesium alloy.

2. The method of claim 1 wherein said alloy contains 56 weight percent copper and 44 weight percent magnesium based upon the total weight of the copper-magnesium alloy.

3. The method of claim 2 wherein said alloy and hydrogen are maintained at a temperature of about 300° C.

4. The method of claim 3 wherein said alloy and the hydrogen are maintained at a pressure of about 200 pounds per square inch.

References Cited

UNITED STATES PATENTS

| | | | |
|---|---|---|---|
| 2,712,730 | 7/1955 | Spangler | 62—48 X |
| 3,315,479 | 4/1967 | Wiswall et al. | 62—48 |

LLOYD L. KING, *Primary Examiner.*